United States Patent
Dowd et al.

(10) Patent No.: US 10,089,759 B2
(45) Date of Patent: Oct. 2, 2018

(54) HOMOGRAPHY-ASSISTED PERSPECTIVE DRAWING

(71) Applicant: Adobe Systems Incorporated, San Jose, CA (US)

(72) Inventors: Geoffrey Dowd, San Francisco, CA (US); Geoffrey Oxholm, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/012,649

(22) Filed: Feb. 1, 2016

(65) Prior Publication Data

US 2017/0221236 A1    Aug. 3, 2017

(51) Int. Cl.
  *G06T 11/20* (2006.01)
  *G06T 11/60* (2006.01)
  *G06F 3/0484* (2013.01)
  *G06T 7/80* (2017.01)

(52) U.S. Cl.
  CPC ........ *G06T 11/203* (2013.01); *G06F 3/04842* (2013.01); *G06F 3/04845* (2013.01); *G06T 7/80* (2017.01); *G06T 11/60* (2013.01)

(58) Field of Classification Search
  CPC ..... G06T 11/203; G06T 7/0061; G06T 11/60; G06F 3/04842; G06F 3/04845
  See application file for complete search history.

(56) References Cited

U.S. PATENT DOCUMENTS

| | | | |
|---|---|---|---|
| 8,416,237 B1* | 4/2013 | Jain ........................ | G06T 15/20 345/420 |
| 9,008,460 B2 | 4/2015 | Shechtman et al. | |
| 9,330,500 B2* | 5/2016 | Karsch .................. | G06T 19/006 |
| 2007/0146389 A1* | 6/2007 | Distler .................... | G06T 15/04 345/629 |
| 2015/0317070 A1* | 11/2015 | Lammers Van Toorenburg .......... | G06F 3/04842 715/771 |

OTHER PUBLICATIONS

H. Kong, "Vanishing point detection for road detection", Computer Vision and Pattern Recognition, 2009. CVPR 2009. IEEE Conference on Jun. 2009, pp. 1-8.*

(Continued)

*Primary Examiner* — Xiao Wu
*Assistant Examiner* — Chong Wu
(74) *Attorney, Agent, or Firm* — Keller Jolley Preece

(57) ABSTRACT

Systems and methods disclosed herein provide drawing assistance to a user that improves the user's ability to draw accurate perspective drawings. In general, a drawing assistance system provides a homography that annotates guidelines over an image and connects lined features of the image to a corresponding vanishing point. More specifically, the homography provides a perspective grid to the user that assists the user in adding drawing strokes to a drawing using the proper perspective. In addition, the drawing assistance system can adjust a user's drawing stroke to properly align with a vanishing point. Further, in some embodiments, the drawing assistance system allows a user to add an asset into a drawing such that the asset is displayed in the proper perspective, even after a user moves the asset within a drawing.

20 Claims, 12 Drawing Sheets

(56) References Cited

OTHER PUBLICATIONS

Rui Nobrega and Nuno Correia, May 2012. "Magnetic Augmented Reality: Virtual Objects in Your Space", Proceedings of the International Working Conference on Advanced Visual Interfaces (AVI '12), 332-335. http://doi.org/10.1145/2254556.2254620.*

Lee, Hyunjoon, et al. "Automatic upright adjustment of photographs." Computer Vision and Pattern Recognition (CVPR), 2012 IEEE Conference on. IEEE, 2012.

* cited by examiner

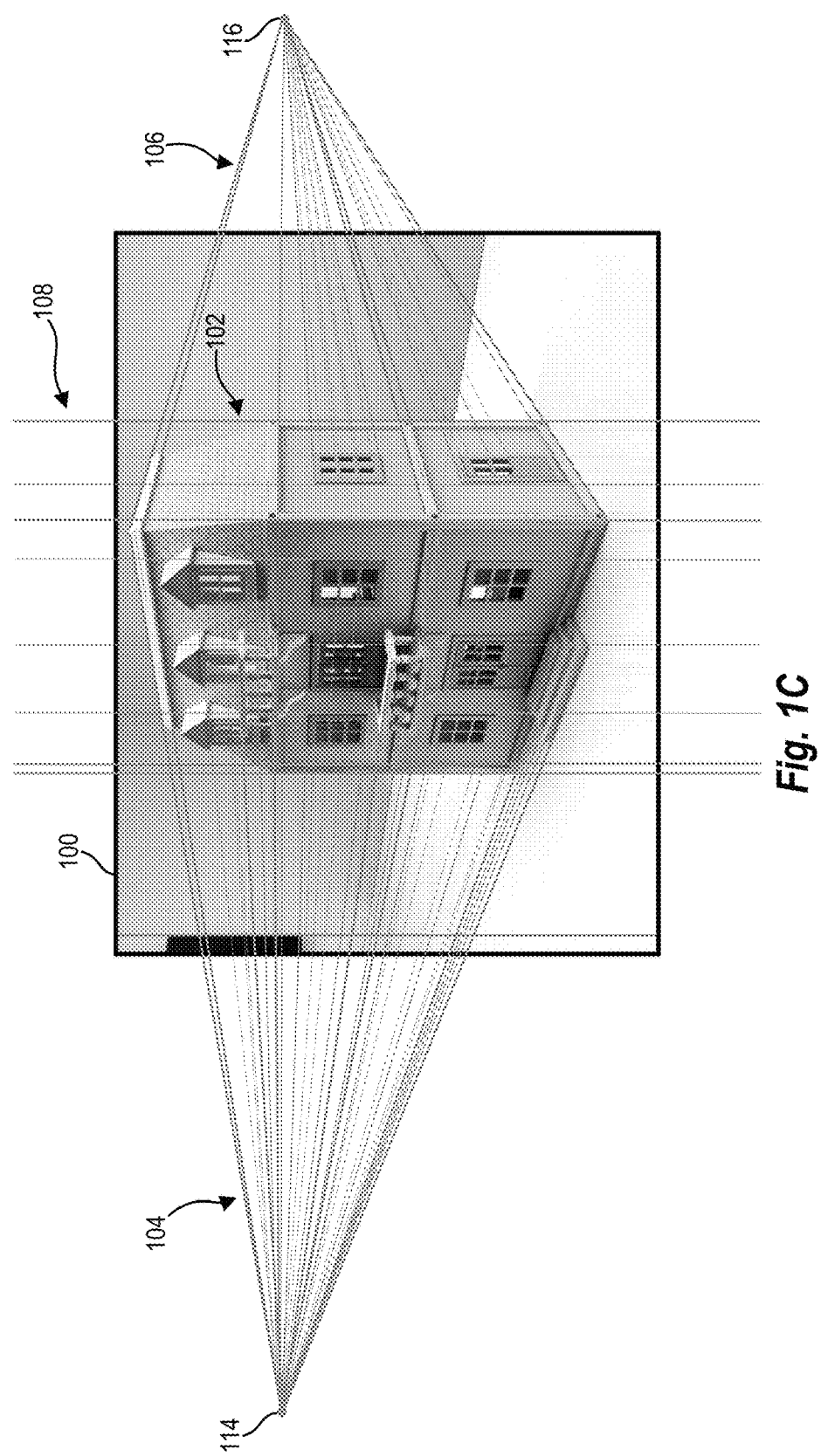

HOMOGRAPHY-ASSISTED PERSPECTIVE DRAWING

CROSS REFERENCE TO RELATED APPLICATIONS

N/A.

BACKGROUND

1. Technical Field

One or more embodiments relate generally to providing a user with drawing assistance. More specifically, one or more embodiments relate to systems and methods of providing a homography that includes guidelines to assist a user in drawing perspective drawings.

2. Background and Relevant Art

Drawing is an important form of communication and expression. Unfortunately, drawing novices are sometimes hesitant to draw because they feel they lack the creative and technical skills to produce works of satisfactory visual quality. Novices commonly state that they are not creative or that they do not know how to draw. Drawing novices often share common challenges that cause them to lack confidence and produce works of lesser quality.

One challenge drawing novices and even advanced drawing users face is how to draw scenery having proper perspective. Capturing the proper perspective of a scene, such as the exterior of a building, is difficult even for many users who have trained in perspective drawing styles. For example, if one of the exterior angles of a building is incorrect or a stroke is aligned improperly, the entire scene can seem out-of-place or otherwise fall short of expectations. Users who try to draw perspective drawings often are uncertain about the angle, shape, and placement of strokes in a drawing of a scene. In some circumstances, after multiple unsuccessful attempts at trying to capture the proper look of a scene, a user may give up altogether because capturing proper perspectives in a drawing appears too difficult.

Some conventional drawing assistance programs traditionally provide a tutorial approach that provides pointers for a user to capture proper perspectives. Without experience though, novice users generally cannot create a satisfactory perspective drawing. Further, as described above, even users who have knowledge and training can struggle with correct placement of lines and angles to accurately capture a scene.

Other conventional drawing assistance programs merely allow a user to draw free hand over an image of a scene. However, many users, even with knowledge of line placement and angles are unskilled and are uncertain when drawing. This uncertainty can cause a user to draw and redraw strokes multiple times resulting in jagged and otherwise skewed strokes that result in drawings that appear unpolished. As another issue, conventional drawing assistance programs do not allow a user to easily deviate from the image, if desired, without the deviation appearing out-of-place.

These and other disadvantages may exist with respect to user assisted perspective drawings systems.

BRIEF SUMMARY

Embodiments described herein provide benefits and/or solve one or more of the foregoing or other problems in the art with systems and methods for assisting users to make perspective drawings and sketches. In particular, one or more embodiments provide an image of a scene on top of which a user can draw strokes. As part of providing the scenery image, the systems and methods provide a perspective graph that includes guidelines showing the proper perspective of the scene. As a user draws a stroke over, or in line with, a guideline, the systems and methods make adjustments and reposition the stroke to conform to the proper perspective. To further improve the user's strokes, the systems and methods smooth out a stroke and/or align a stroke to one of the perspective guidelines.

The systems and methods disclosed herein allow users with little or no training to create visually pleasing drawings of scenery. For example, the systems and methods of one or more embodiments provide perspective grid of guidelines that show a user where to place strokes within a scene. In particular, the guidelines help a user draw strokes in a drawing such that the drawing captures the proper look and perspective of the scene. As such, the systems and methods disclosed enable a user to overcome his or her inexperience and uncertainty when making a perspective drawing. Further, the systems and methods disclosed herein provide such benefits while maintaining a user's individual style so as to produce drawings that help provide the user with a sense of ownership and a high degree of personal satisfaction.

In addition, the systems and methods disclosed herein enable a user to correctly add assets to a drawing. For example, when a user adds a shape, such as a rectangle representing a window, to a drawing, the systems and methods adjust the shape to conform to the proper perspective. Further, as the user moves the shape about the drawing, the systems and methods continually skew and adjust the shape to maintain the proper perspective depending on the location of the shape within the drawing.

As described in additional detail below, the systems and methods obtain an image of a scene that includes lined features such as the edges and ledges of a building. Using the perspective information and lined features, the systems and methods compute a perspective grid having guidelines, called a homography, where the guidelines on the perspective grid converge toward one or more vanishing points associated with the perspective grid. In this manner, the guidelines connect each lined feature to a corresponding vanishing point, which provides a template for a user to follow. Using the guidelines, the user can add strokes that follow the guidelines and the systems and methods adjust the stroke to align with the guidelines.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIGS. 1A-1E illustrate various portions of user interfaces provided by the drawing assistance system to assist a user in creating a perspective drawing in accordance with one or more implementations;

DETAILED DESCRIPTION

Figure 1A:
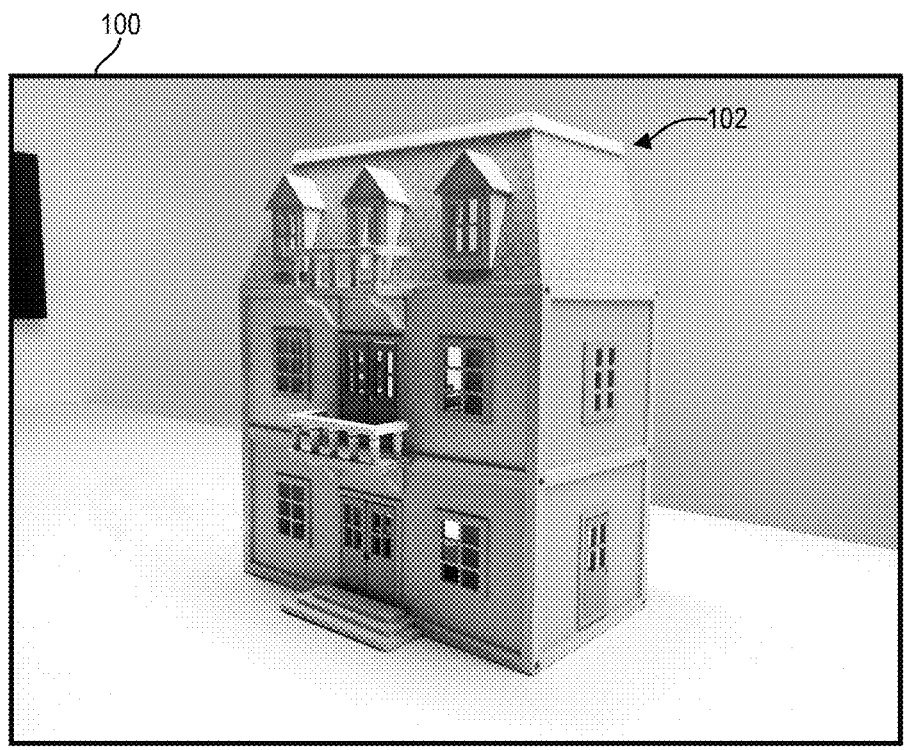

One or more embodiments described herein include a drawing assistance system that helps a user create a cohesive perspective drawing or sketch. In particular, the drawing assistance system provides an image having a perspective grid over which a user can draw. As a user draws a stroke in line with a guideline from the perspective grid, the drawing assistance system adjusts the user's drawing stroke to ensure the stroke follows the proper perspective and that the stroke does not look and feel out-of-place. To further improve the user drawn lines, the drawing assistance system can align a stroke to a guideline from the perspective grid that matches an edge found in the image.

The drawing assistance system disclosed herein allows users with little or no training to create visually pleasing drawings that satisfy human-perceived expectations of perspective drawings. In particular, the drawing assistance system can obtain or calculate perspective information for an image of a scene that includes various lined features such as edges of a building or corners within a room. The perspective information can include the position and direction of each lined feature within the image. As used herein, the term "perspective information" generally refers to information corresponding to an image captured by a computing device. Perspective information can include, but is not limited to camera parameters, three-dimensional rotation information, and vanishing point information.

In addition, the drawing assistance system can compute a homography and the resulting perspective grid with guidelines based on the perspective information and the lined features. As used herein, the term "homography" generally refers to a bijection (i.e., a function between the elements of two sets, where every element of one set is paired with exactly one element of the other set, and every element of the other set is paired with exactly one element of the first set) or projective transformation that maps lines to lines. As described herein, a homography includes a perspective grid of guidelines that provide a template of the perspective for an image. The perspective grid can be parallel guidelines or guidelines converging to one of the vanishing points associated with the image.

The term "vanishing point," as used herein generally refers to a point in an image plane that is the intersection of the projections of a set of parallel lines in space on to the image plane. For example, when an image plane is parallel to two world-coordinate axes, lines parallel to the axis that is cut by the image plane will meet at infinity (i.e. at the vanishing point). A vanishing point can be formed based on the lined features in the image (e.g., edges, corners, ledges, horizontal lines, and diagonal lines), which converge towards a vanishing point. Additionally, an image can include multiple vanishing points, such as two, three, or more vanishing points.

As part of the homography, the drawing assistance system computes and displays (if located within the image) vanishing points associated with the image to which the guidelines in the perspective grid converge. In particular, the perspective grid provides guidelines that connect each lined feature to a corresponding vanishing point. As such, the guidelines serve as a template for a user to follow when drawing perspectives of the scene.

In some embodiments, the drawing assistance system may provide a drawing tool that allows a user to add strokes in line with the guidelines. Further, the drawing assistance system optionally automatically adjusts a stroke provided by a user to align with nearby guidelines in order to ensure that the stroke conforms to a vanishing point. In this manner, the drawing assistance system enables a user to maintain the correct perspective in a drawing while also preserving the user's personal style of drawing. As such, because a user's personal style is preserved, the drawing assistance system helps provide the user with a sense of ownership and a connection to the output drawing, as well as a high degree of personal satisfaction for creating an accurate and high-quality drawing.

In addition to providing a perspective grid that assists a user in maintaining the correct perspective while drawing, the drawing assistance system also allows a user to add assets to a drawing. When a user adds an asset, the drawing assistance system adjusts the shape of the asset such that the asset is displayed in the proper perspective and with the proper angles. Further, as the user moves the asset around the image, the drawing assistance system adjusts the shape of the assets to provide a professional look irrespective of the location where the user placed the asset.

For example, when a user draws the interior of a room using the perspective grid, which enables the user to correctly capture the various angles and edges in the room, the user may add a piece of furniture to the room, such as a couch. Based on where the user adds the couch, the outline and shape of the couch may need to change in order have proper looking perspective. As a user positions the couch in various locations within the room, the drawing assistance system adjusts the shape of the couch to conform to the perspective grid.

FIGS. 1A-1E illustrate portions of various user interfaces that the drawing assistance system provides to assist a user in creating a perspective drawing. A client device, such as the client device described below in FIG. 5, may host or implement the drawing assistance system. As shown in FIG. 1, the drawing assistance system may obtain an image, in this case an image of a dollhouse. The dollhouse image shown and described in connection with FIG. 1 represents one example image having a scene including exterior structures that the drawing assistance system can use to assist a user in drawing.

FIG. 1A shows an image 100 that includes the exterior of a dollhouse 102. The dollhouse 102 includes a number of lined features, such as corners, ledges, edges, and other architectural straight/parallel lines. For example, lined features found in the dollhouse 102 include parts of the following elements: windows, doors, molding at the top and bottom of each floor, front steps, balconies, roof, and portions of the dormers.

Figure 1B:
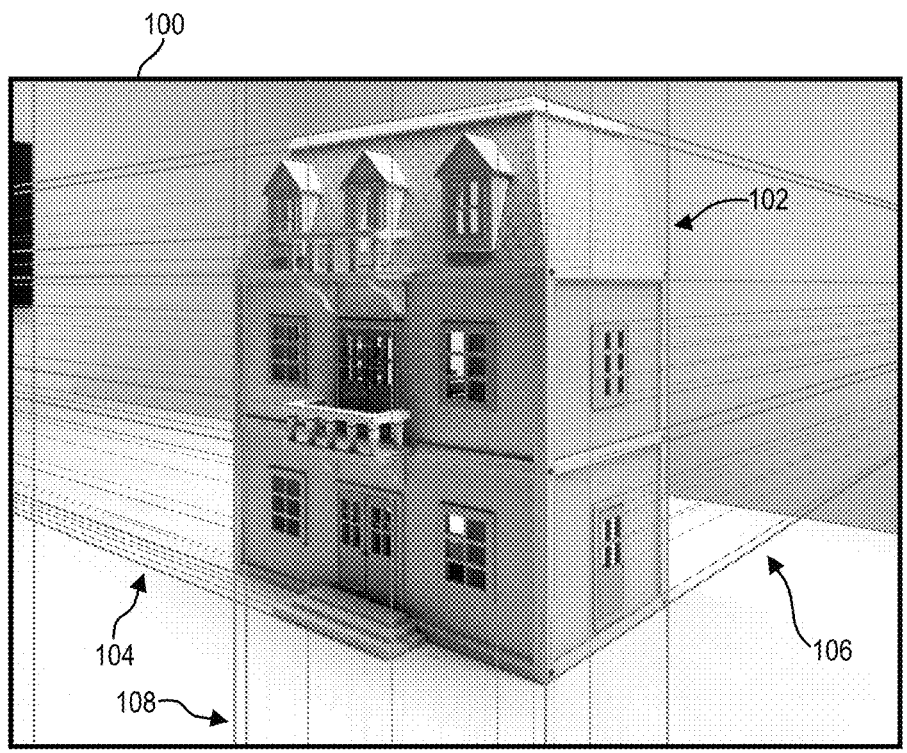

Using the lined features and perspective information, the drawing assistance system computes a homography for the image. As shown in FIG. 1B, the drawing assistance system calculates and overlays a perspective grid over the image of the dollhouse 102. In particular, guidelines 104 align the front of the dollhouse 102 and converge towards a first vanishing point. Guidelines 106 align with the side of the dollhouse 102 and converge to a second vanishing point. The vertical guidelines 108 run parallel with each other in a vertical manner. The process of computing the guidelines and determining which lined features belong to which vanishing point is described in detail below.

In one or more embodiments, the thickness, hue, and/or opacity of a guideline vary based on how strong the guideline corresponds to a lined feature, as compared to other guidelines from the same vanishing point. For instance, a guideline that corresponds to the roof of the dollhouse 102 will have a stronger correspondence than a guideline (from the same vanishing point) that corresponds to a window or door because the lined feature of the roof is longer than the lined feature of the window or door. Guidelines that have stronger correspondences can appear thicker, richer, and/or more opaque than guidelines from the same vanishing point that have weaker correspondences. In some example cases, for the same vanishing point, the guideline having the weakest correspondence is ⅛ as bright and/or thick as the guideline having the strongest correspondence. Furthermore, the guideline having the median correspondence is ½ as bright and/or thick as the guideline having the strongest correspondence. Alternatively, all of the guidelines can be compared and ranked with each other, and adjusted (e.g., adjust the thickness, hue, and/or transparency) based on the rankings irrespective of the vanishing point to which the guideline corresponds.

Along the same lines, guidelines belonging to different vanishing points can have different characteristics, such as color. For example, guidelines belonging to the first vanishing point can be blue, guidelines belonging to the second vanishing point can be green, and the vertical guidelines red. By varying the color of the guidelines in the perspective grid, the drawing assistance system allows a user to easily ascertain the vanishing point to which a guideline corresponds, which can be particularly helpful when guidelines from multiple vanishing points overlap each other. Further, in some embodiments, the drawing assistance system can provide an option to view/hide only guidelines belonging to a selected vanishing point (or multiple selected vanishing points).

As previously mentioned, the first set of guidelines 104 converge to the first vanishing point and the second set of guidelines 106 converge to the second vanishing point. To illustrate the convergence, FIG. 1C includes the first vanishing point 114 and the second vanishing point 116. Depending on the perspectives included in an image, the drawing assistance system can include one or more vanishing points as part of the perspective grid shown in the image. If, however, a vanishing point is located outside of the image, then the drawing assistance system may not display the vanishing point within the image, like in FIG. 1B. Further, while FIG. 1C illustrate two vanishing points 114, 116, one will appreciate that in some embodiments, a perspective grid includes additional sets of guidelines, depending on the number of perspectives presented in an image.

As a note, FIG. 1C illustrates two sets of guidelines running in a right-to-left manner and one set of vertical guidelines. One will appreciate that the drawing assistance system can likewise provide a homography for an image having multiple sets of guidelines running in a top-to-bottom manner and a horizontal set of guidelines if the perspectives in the image are rotated. Further, in some embodiments, the drawing assistance system may provide a homography having sets of guidelines that converge to vanishing points in different directions, such as two sets of guidelines running right-to-left, a third set running diagonally, and a fourth vertical set.

As shown in the Figures, the guidelines provided by the drawing assistance system generally overlap with corresponding lined features found in the image. For example, as shown in FIG. 1C, the top most guideline from the first vanishing point 114 corresponds to the roof of the dollhouse 102 in the image 100. In some embodiments, however, the drawing assistance system can vary a guideline from a corresponding lined feature. For instance, if a lined feature does not perfectly align with a vanishing point, the drawing assistance system maps the guideline to the vanishing point rather than perfectly overlapping the guideline with the lined feature, which may cause the guideline to deviate from, cross over, or run alongside the lined feature.

Once the drawing assistance system provides the guidelines, a user can create a drawing by adding strokes over the image based on the guidelines. As used herein the term "stroke" refers to at least a portion of a line. For example, a stroke can comprise an entire line defined by a starting point at which the user engages an input device, an ending point at which the user disengages the input device, and a path between the starting point and the ending point. Alternatively, a stroke can comprise only a portion of a line defined by a starting point at which the user engages an input device, an ending point at which the user disengages the input device, and a path between the starting point and the ending point.

Figure 1D:
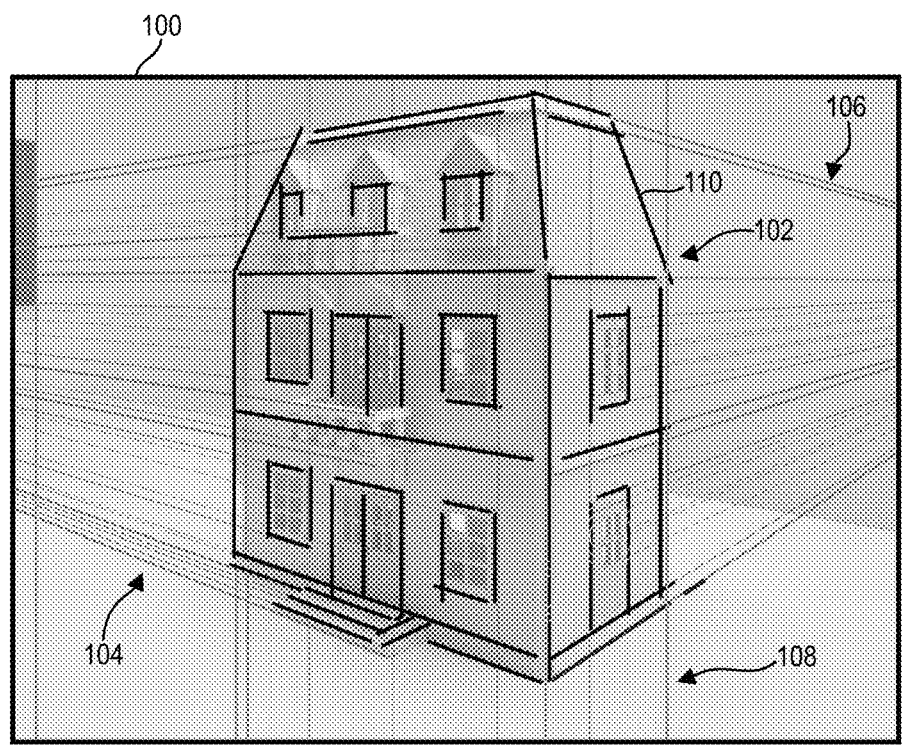

To illustrate, FIG. 1D shows strokes 110 added on top of the image 100. The drawing assistance system allows a user to add strokes overlapping or adjacent to a specific guideline. Alternatively, the user may add a stroke away from any guidelines. For example, the user may desire to deviate from the image and draw different features, but still draw the features using the proper perspective.

More specifically, when adding a drawing stroke, the user generally selects a vanishing point or a guideline (that is associated with a particular vanishing point) to which to add the stroke. Selecting a vanishing point allows a user to add a stroke aligned to a particular perspective. Regardless of if a user adds a stroke directly to a guideline or between guidelines, the drawing assistance system can ensure that the stroke added by the user conforms to the vanishing point selected by the user.

When the user desires to add a stroke reflecting a different perspective, the user can select a different vanishing point or select the vertical guidelines. Again the user can add a stroke and the drawing assistance system ensures that the added stroke conforms to the selected perspective by aligning the drawing stroke to the selected vanishing point or the vertical guidelines.

Further, in some embodiments, when a user moves a stroke within the drawing, the drawing assistance system automatically adjusts the angle of the stroke to maintain proper alignment with the corresponding vanishing point. For example, a user may move a stroke (or group of strokes) from a dormer window of the dollhouse 102 to a first floor window. In moving the stroke, the drawing assistance system adjusts the angle of the stroke to maintain the proper perspective. In addition, as described below, when a user manipulates a shape, including groups of strokes, the drawing assistance system adjusts the shape to maintain the proper alignment.

Figure 1E:
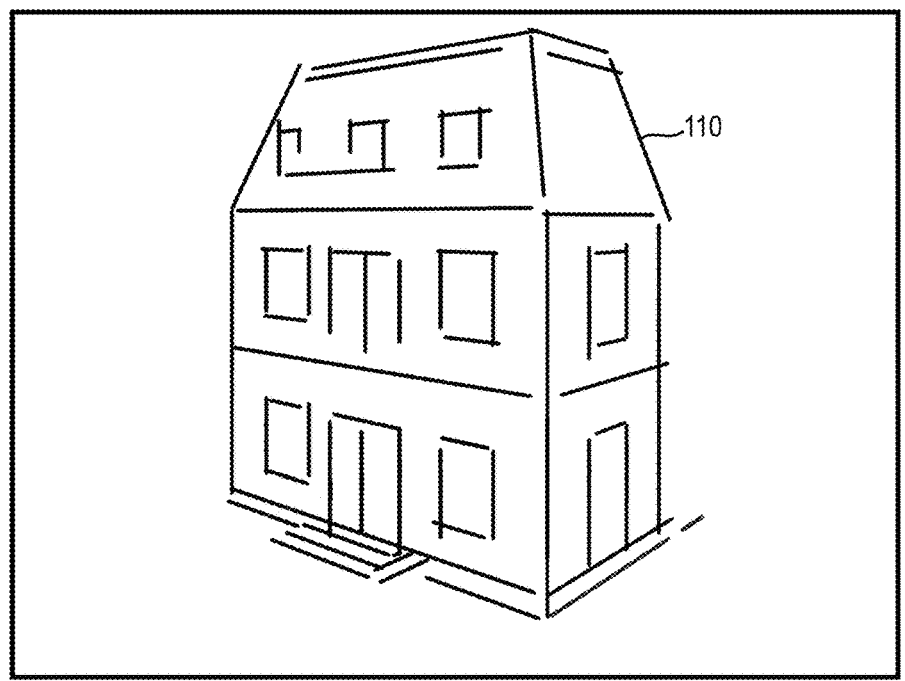

While adding strokes to the drawing, the drawing assistance system can selectively hide the image behind the drawing, as shown in FIG. 1E. With the image hidden, the user can clearly see his or her creation. If the user desires to again view the image, the user can again toggle the visibility of the image to make the image reappear. In addition, once the user is satisfied with the drawing, the user can save the drawing and/or export the drawing to another program.

In some embodiments, the drawing assistance system provides additional drawing features to a user. For example, the drawing assistance systems provide tools for the user to change the brush type, size, and/or color used when adding (or editing) strokes. In addition, the drawing assistance system may allow a user to add color, texture, shading, highlighting, to the drawing. For instance, the drawing assistance system may provide tools to a user that allow the user the add texturing to a plane within the drawings, such as the exterior wall of a building.

Figure 2A:
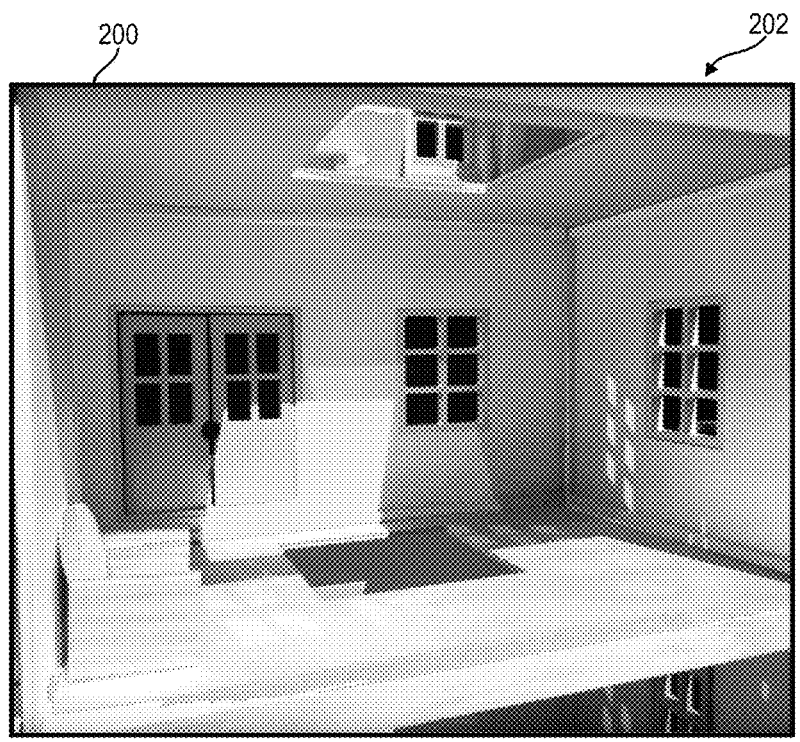
FIGS. 2A-2C illustrate another example of various portions of user interfaces provided by the drawing assistance system to assist a user in creating a perspective drawing in accordance with one or more implementations.
Figure 2B:
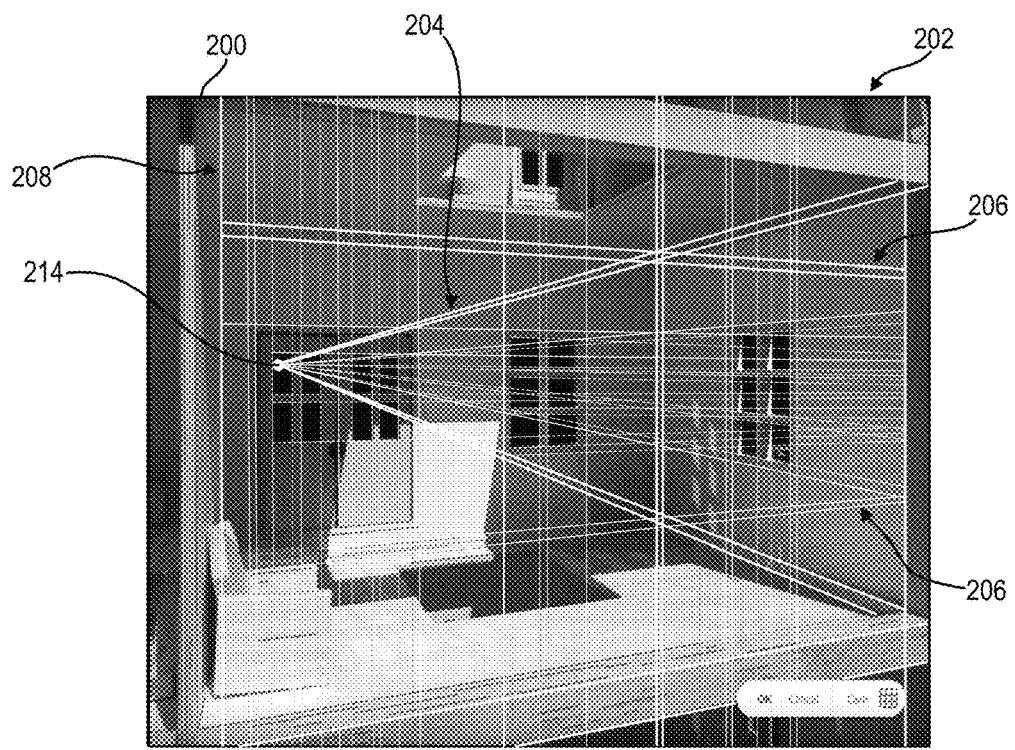

FIGS. 2A and 2B illustrate another example of the drawing assistance system assisting a user in creating a perspective drawing. While the perspectives between an exterior image and an interior image appear to be quite different, the same principles apply when computing vanishing points and creating a homography. As such, the drawing assistance system can equally assist a user in capturing and creating a drawing using an image of a room or other interior image. To illustrate, FIG. 2A shows an image 200 of a dollhouse bedroom 202. The bedroom 202 includes windows, doors, and furniture. Using the image 200, the drawing assistance system computes a homography to overlay on top of the image.

As shown in FIG. 2B, the drawing assistance system provides a homography that includes a perspective grid overlaying the image 200. The perspective grid includes a first set of guidelines 204 converging to a first vanishing point 214. The perspective grid also includes a second set of guidelines 206 converging to a second vanishing point that if displayed, would appear to the right and beyond the image 200. Further, the perspective grid includes vertical guidelines 206.

Figure 2C:
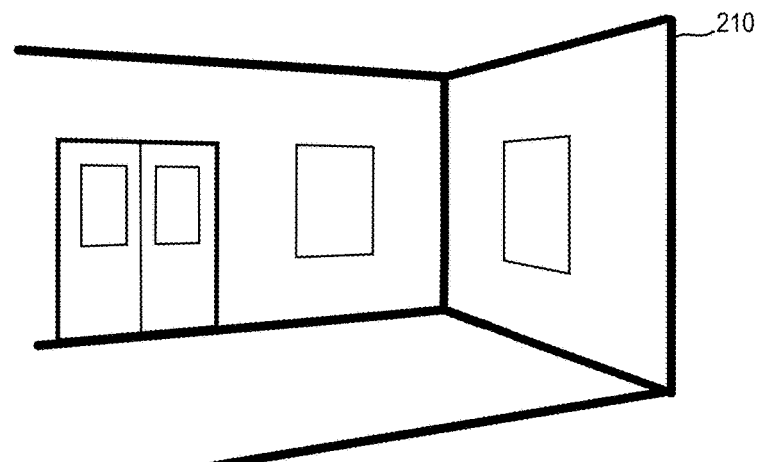

As described above, the guidelines from the perspective grid assist a user to add strokes to a drawing. For example, FIG. 2C illustrates a rough line drawing 210 of the dollhouse bedroom 202 created using the guidelines. Accordingly, the drawing assistance system enables a user to easily and accurately draw images using the proper perspective in a way that is rewarding to the user.

Figure 3A:
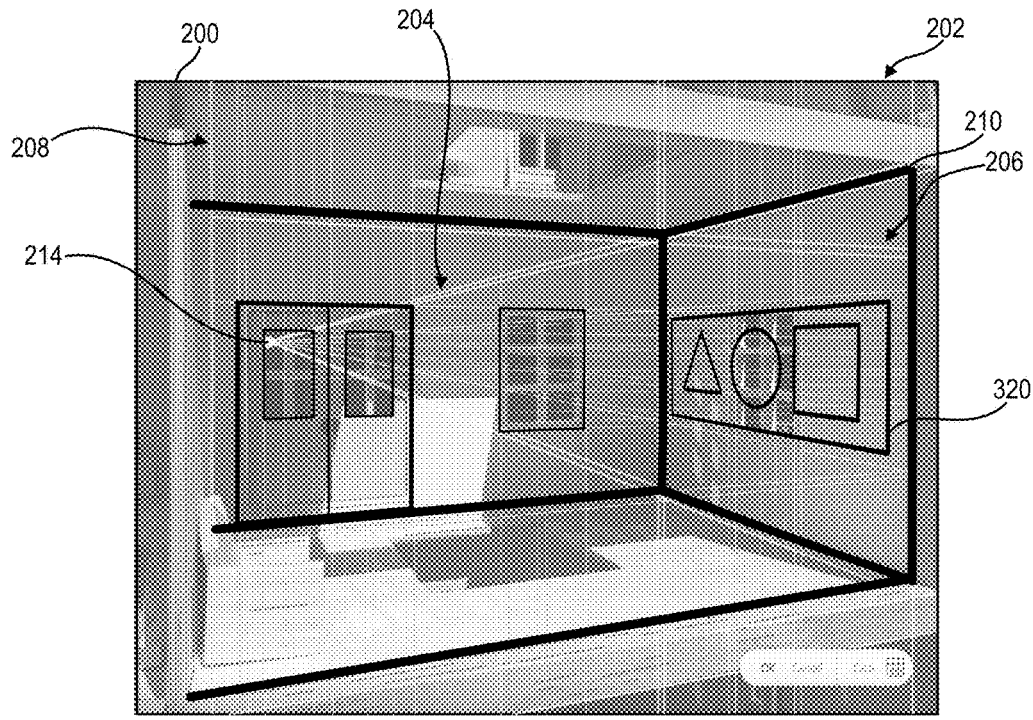
FIGS. 3A-3C illustrate various portions of user interfaces provided by the drawing assistance system to assist a user in inserting assets into a drawing with proper perspective in accordance with one or more implementations.
Figure 3B:
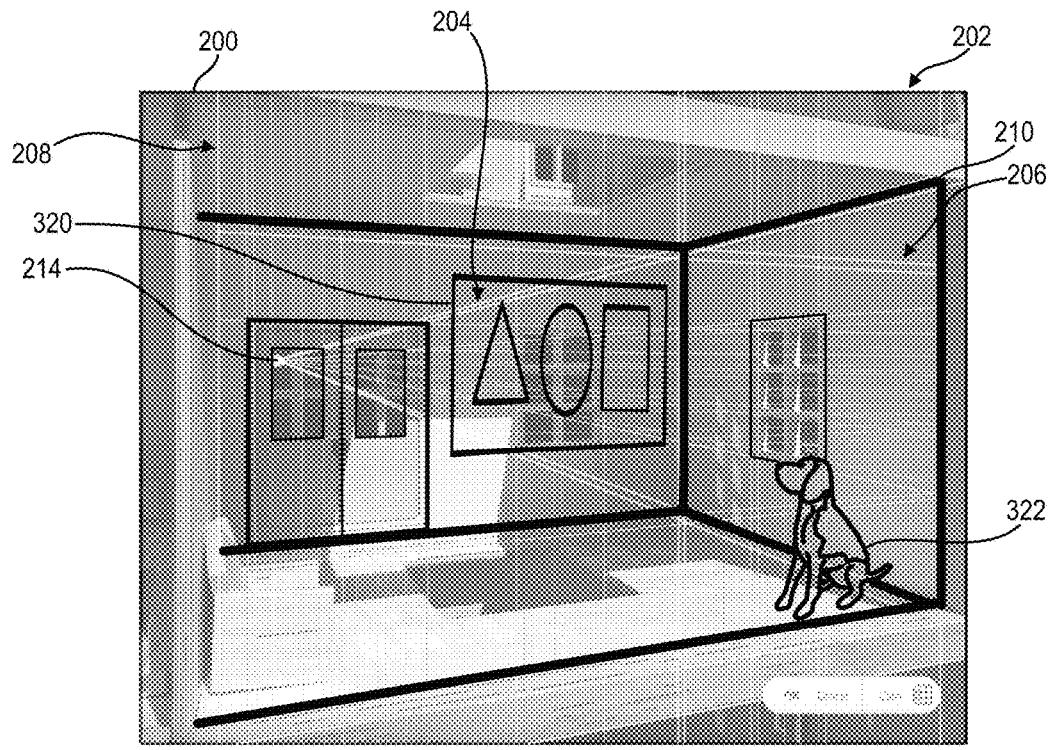

In addition to assisting a user in creating perspective drawings, the drawing assistance system allows a user to add assets into a drawing. Assets include geometric shapes, lines, or other features. FIGS. 3A and 3B illustrate a user inserting assets into a drawing. In particular, FIG. 3A illustrates the line drawing 210 from FIG. 2C with the addition of a user adding an asset (e.g., a poster 320) to one of the interior walls.

The drawing assistance system optionally provides an asset library from which a user can select one or more assets to insert into a drawing. The asset library comprises sections, such as interior or exterior assets. In some embodiments, the asset library is organized by category, such as geometric shapes, furniture, fixtures, art, people, pets, business, transportation, recreation, etc. Further, the asset library provides search functionality to a user to easily find a particular asset. In various embodiments, if the asset library does not have a particular asset, the the drawing assistance system imports the asset or creates the asset.

As shown in FIG. 3A, the poster 320 is added to the line drawing 210. Upon selecting the poster 320 to insert into the drawing 210, the drawing assistance system allows the user to shift, move, and resize the asset. For example, the user can shrink the poster 320 and move the poster up and to the left. As the user changes the dimensions and location of the poster 320, the drawing assistance system automatically adjusts the shape of the poster to maintain a proper perspective. In this manner, irrespective of how a user manipulates an asset, the drawing assistance system properly adjusts the shape of the asset. In particular, the drawing assistance system adjusts the asset to maintain the proper perspective by adjusting the shape of the asset with respect to a particular vanishing point. Thus, when a user adds an asset to the drawing, the drawing assistance system identifies a particular vanishing point (e.g., the currently selected vanishing point) and adjusts the asset with respect to the vanishing point, even as the user moves and edits the asset.

As a specific example, a user draws the interior of a room using the perspective grid, which enables the user to correctly capture the various angles and edges in the room. The user then adds a piece of furniture to the room, such as a couch. Regardless of where the user adds the couch, the shape of the couch needs to look as if it belongs in the room. Thus, as a user positions the couch in various locations within the room, the drawing assistance system adjusts the shape of the couch to conform to the perspective grid and to look as if the user drew the couch with the perspective to fit the location where the user placed the couch.

In some embodiments, the drawing assistance system allows the user to change the vanishing point to which the assets correspond. For example, if the user wants to switch the wall on which the poster 320 is displayed (and thus change the perspective at which the poster 320 is viewed), the user can select an option to switch the poster 320 to correspond to a different vanishing point. To illustrate, FIG. 3B shows the poster 320 displayed on the opposite wall than from FIG. 3A. Specifically, as shown in FIG. 3B, when the user moves the poster 320, the drawing assistance system automatically skews the poster 320 to align to the second vanishing point.

As further illustrated in FIG. 3B, not only has the user changed the poster 320 to align with the second vanishing point, but the user has also manipulated (e.g., shortened and stretched) the poster 320. Even with the user's movement and manipulation of the poster 320, the drawing assistance system adjusts the shape and skew of the poster 320 to maintain proper perspective. Additionally, FIG. 3B shows an asset of a dog 322 inserted into the line drawing. Again, the drawing assistance system adjusts the dog 322 with respect to the first vanishing point to ensure proper perspective.

In one or more embodiments, the drawing assistance system replaces strokes within the line drawing 210 with the inserted asset. To illustrate, in each of FIGS. 3A and 3B, the poster 320 is placed in front of a window. In response, the drawing assistance system replaces the window with the asset. Similarly, in FIG. 3C, when the user adds the dog 322 to the line drawing 210, the drawing assistance system hides the overlapped portion of the stroke covered by the dog 322. Alternatively, the drawing assistance system transparently overlays an asset over one or more strokes such that both the stroke and the asset are visible.

Figure 3C:
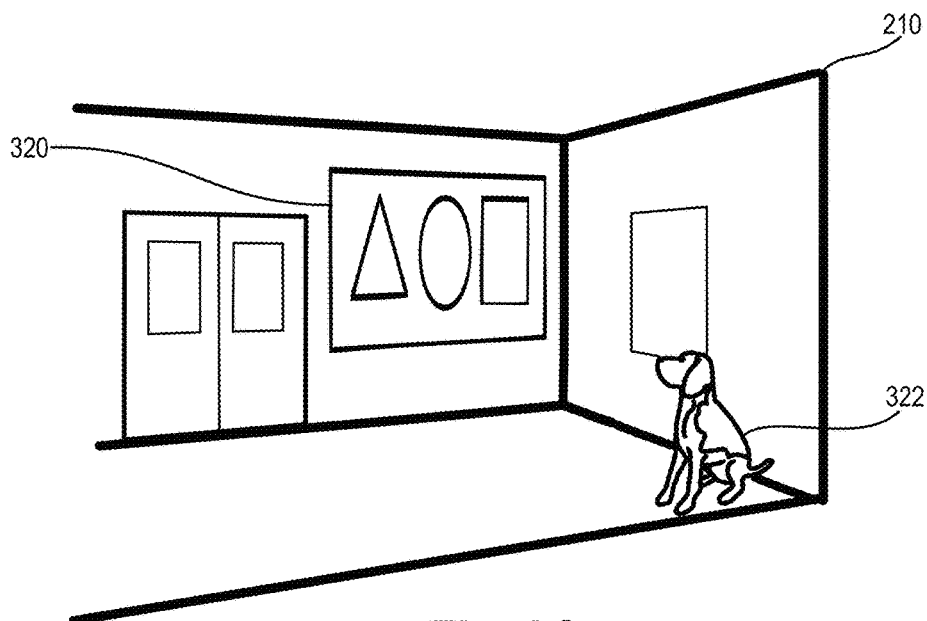

FIG. 3C illustrates the line drawing 210 of FIG. 3B. As described above, the drawing assistance system allows the user to toggle visibility (e.g., hide) of the image 200 to view only the line drawing 210. In some embodiments, the drawing assistance system allows the user to hide the image and still display the perspective grid including the guidelines. For example, the user selects a menu option to hide the image 200 and selects another menu option to keep the guidelines visible. In this manner, the user can continue to draw on the line drawing 210 using the perspective grid as a guide. Further, the drawing assistance system can continue to adjust the added drawing strokes to ensure a smooth drawing and proper perspective.

Further, in various embodiments, the user can draw freehand on the line drawing 210. For example, the user can select an option to turn off perspective-assisted drawing. Alternatively, the user can export the line drawing 210 and continue to draw using another program, such as an image creation/editing application (e.g., ADOBE® PHOTOSHOP® or ADOBE® ILLUSTRATOR®).

Figure 4A:
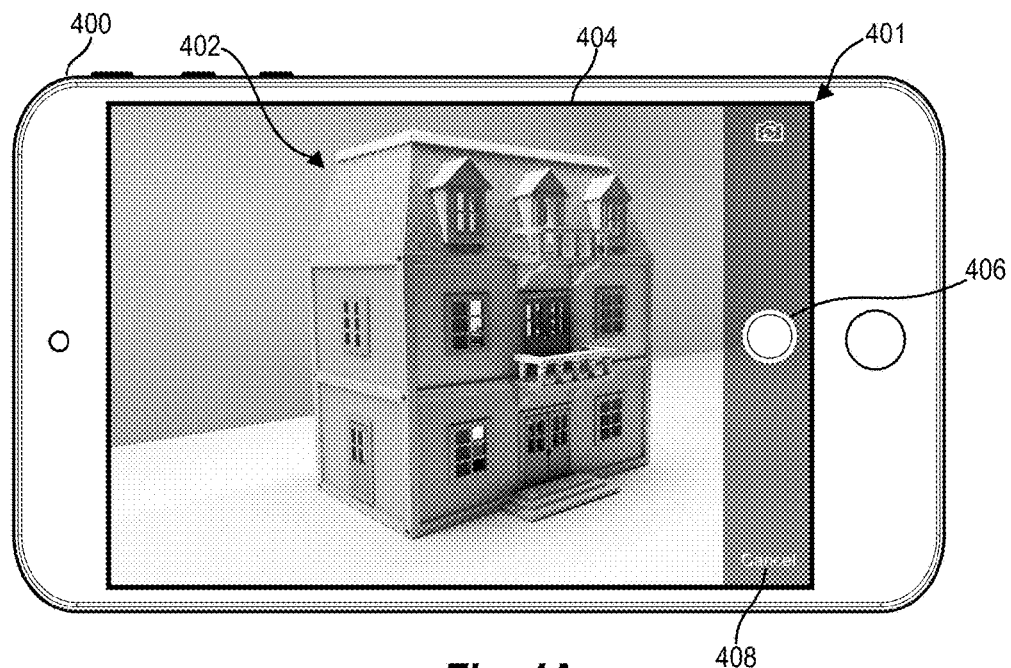
FIGS. 4A-4D show various view of a graphical user interface on a client device for creating a perspective drawing in accordance with one or more implementations.

FIGS. 4A-4D show a graphical user interface 401 on a client device 400 for creating a perspective drawing. The client device 400 includes a touch screen. The client device 400 also includes image-capturing hardware, such as a camera, that allows a user to capture a digital image. In particular, as shown in FIG. 4A, the user can view a preview 404 of a dollhouse 402 through the graphical user interface 401 of the client device 400. If the user is satisfied with the preview 404, the user can capture an image using the image capture option 406 (e.g., a virtual shutter button displayed on the graphical user interface 401) or using a button on the client device 400. If the user desires to exit the preview mode, the user can select the cancel option 408.

Figure 4B:
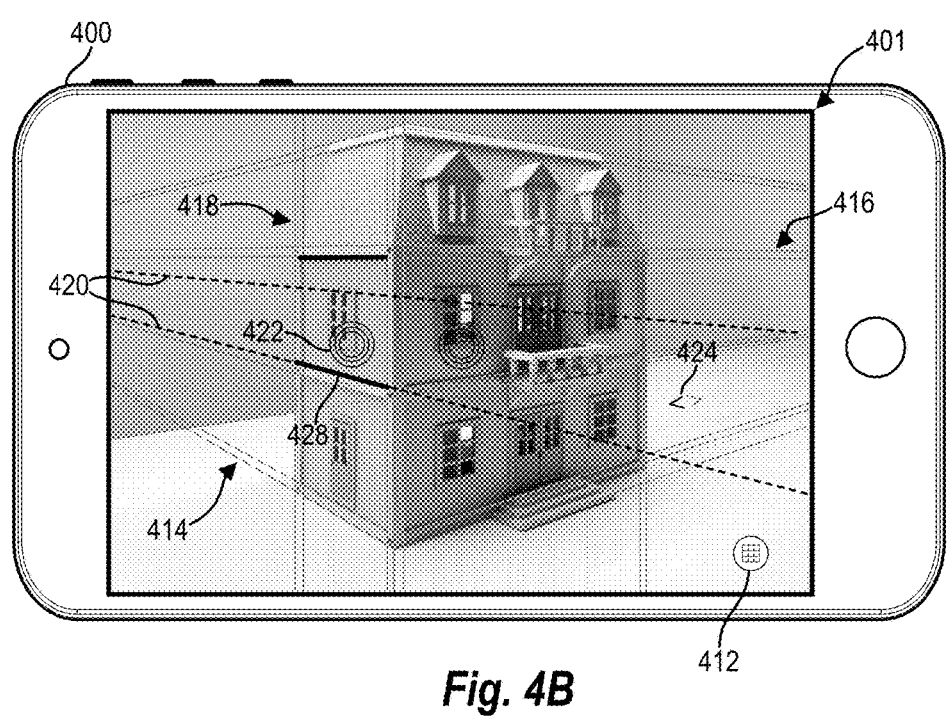

FIG. 4B shows a captured image 410 within the graphical user interface 401 of the client device 400. FIG. 4B also shows a homography within the graphical user interface 401. The homography includes a perspective grid including a first set of guidelines 414, a second set of guidelines 416, and vertical guidelines 418 (which are parallel but not exactly vertical). In some embodiments and as shown in FIG. 4B, the graphical user interface 401 includes a perspective grid option 412 to toggle the perspective grid on and off. In additional embodiments and as described below, the drawing assistance system may automatically straighten a captured image such that the vertical guidelines are truly vertical.

In addition to displaying the perspective grid, the graphical user interface 401 includes a drawing guide. The drawing guide includes drawing guidelines 420, drawing tools 422 (shown as two sets of circles within circles), and a vanishing point selector 424. The drawing guidelines 420 enable a user to add a stroke 428 in a drawing along one of the drawing guidelines 420, which align to a selected vanishing point. Further, the user can use the drawing tools 422 to position the drawing guidelines 420. Specifically, the user can move (e.g., relocate) and resize (e.g., pinch and expand) the drawing guidelines 420 using the drawing tools 422. As such, the drawing assistance system allows the user to move (e.g., select and drag one or both drawing tools) and adjust the height and size of the drawing tools 422 such that the drawing guidelines move and change in response to the user interaction.

Figure 4C:
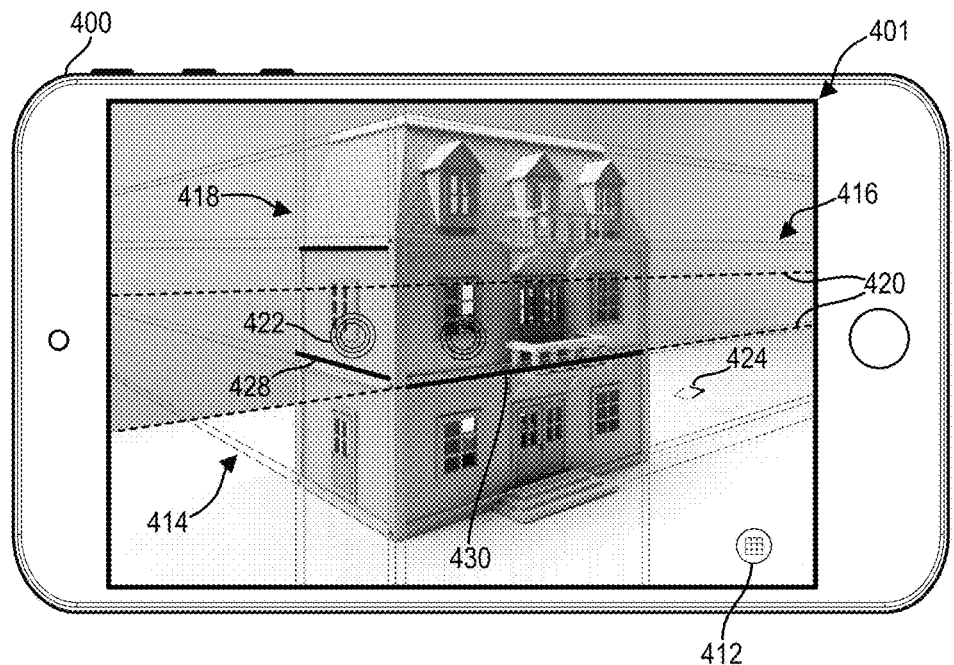

The drawing assistance system also provides a vanishing point selector 424 that allows a user to change to which vanishing point the drawing guidelines correspond. For example, upon a user selecting the vanishing point selector 424, the graphical user interface 401 changes the drawing guidelines 420 to align the to second vanishing point, as shown in FIG. 4C. By changing the selected vanishing point to the second vanishing point, the drawing assistance system allows a user to add a stroke 430 to a different drawing plane.

Figure 4D:
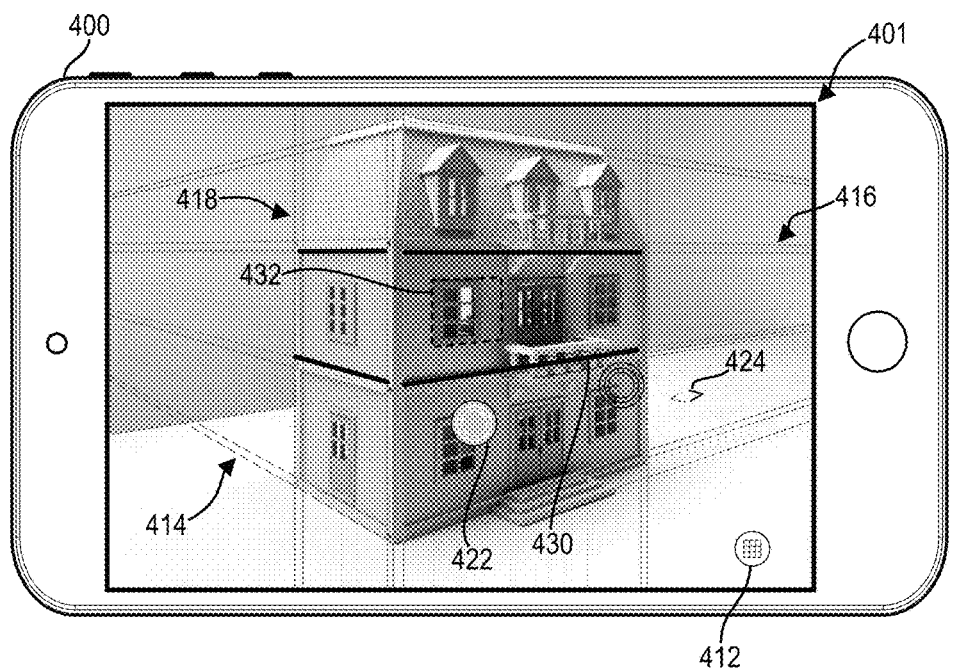

In addition to adding drawing strokes 428 and 420, the user can use the drawing tools 422 to add different shapes and/or assets to the drawing. As shown in FIG. 4D, the user is selecting the left drawing tools 422, which switches the drawing guidelines 420 to a square guideline 432. The user can continue to select the drawing tools 422 to cycle though other drawing guides, such as other shape guidelines, or to return to the drawing guidelines 422. Further, as with the drawing guidelines 420, the user can interact with the drawing tools 422 to move, resize, stretch, etc. the square guideline 432. The user can then use the square guideline 432 to add strokes to the drawing forming a square, or portions of a square.

Figure 5:
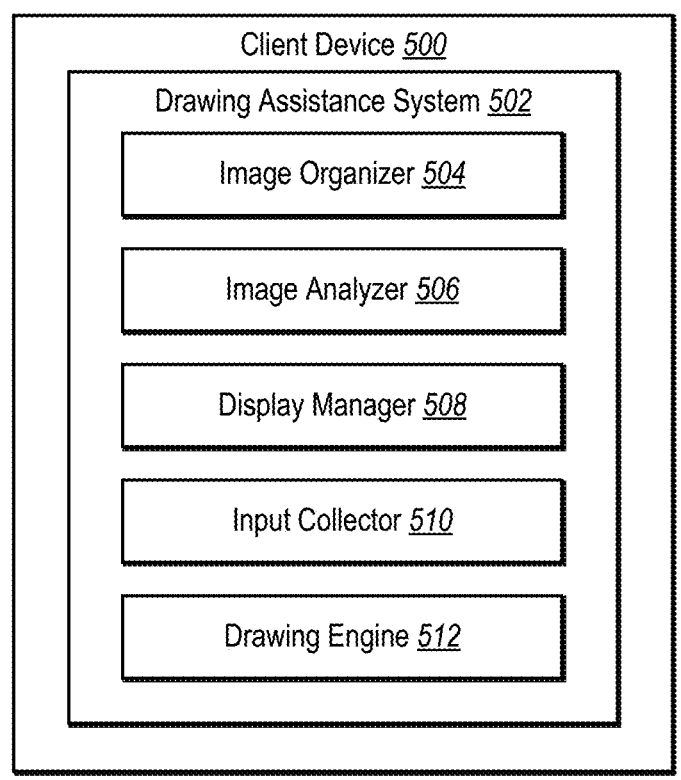
FIG. 5 illustrates a schematic overview of an exemplary architecture of a drawing assistance system in accordance with one or more implementations.

FIG. 5 illustrates an embodiment of an exemplary drawing assistance system 502. The drawing assistance system 502 operates on a client device 500 and includes, but is not limited to an image organizer 504, an image analyzer 506, a display manager 508, an input collector 510, and a drawing engine 512. Each of the components 502-512 of the drawing assistance system can be in communication with one another using any suitable communication technologies.

It will be recognized that although the components 502-512 of the drawing assistance system 502 are shown to be separate in FIG. 5, any of components 502-512 may be combined into fewer components, such as into a single component, or divided into more components as may serve a particular implementation. The components 502-512 can comprise software, hardware, or both. For example, the components 502-512 can comprise one or more instructions stored on a computer-readable storage medium and executable by processors of one or more computing devices (e.g., client device 500). When executed by the one or more processors, the computer-executable instructions of the drawing assistance system 502 can cause the client device 500 to perform the drawing assistance methods described herein. Alternatively, the components 502-512 can comprise hardware, such as a special purpose processing device to perform a certain function or group of functions. Additionally, the components 502-512 can comprise a combination of computer-executable instructions and hardware.

Furthermore, the components 502-512 of the drawing assistance system 502 may, for example, be implemented as a stand-alone application, as a module of an application, as a plug-in for applications including image processing applications, as a library function or functions that may be called by other applications such as image processing applications, and/or as a cloud-computing model. Thus, the components of the drawing assistance system 502 may be implemented as a stand-alone application, such as a desktop or mobile application. Alternatively, the components of the drawing assistance system 502 may be implemented in any image processing application, including but not limited to ADOBE® PHOTOSHOP®, ADOBE® PHOTOSHOP ELEMENTS®, and ADOBE® ILLUSTRATOR®.

The image organizer 504, as shown in the drawing assistance system 502, captures or otherwise obtains digital images. For example, a user may use the client device 500 to capture an image (e.g., take a picture with a camera). As another example, the image organizer 504 loads an image stored on the client device 500 or loads an image stored on an external source (e.g., on a network cloud device).

In some embodiments, the image organizer 504 provides a live image to the user. The client device 500 captures the live image. Alternatively, another computing device captures the live image and sends a live image feed to the client device 500. For example, a computing device can simultaneously stream a live image to multiple client devices.

The image organizer 504 presents the image to a user. For instance, the image organizer 504 provides, via the display manager 508 described below, a number of scenic images of which the user can create perspective line drawings. The user can select an image to draw, and upon the user selection, the image organizer 504 displays the image to the user.

Regardless of how the image organizer 504 obtains and presents a scenic image to a user, once an image is presented to a user, the image analyzer 506 analyzes the image and creates a homography for the image. The image analyzer 506, in near real time, analyzes the lined features in the image and perspective information for an image. Based on the analysis, the image organizer 504 determines vanishing points for the image and displays a perspective grid to the user.

When the image is provided in real-time, the image analyzer 506 reanalyzes and updates the homography on the fly. In general, the image analyzer 506 performs homography updates faster that calculating a new homography for an image. As such, when the user is viewing a live image and the live feed shifts and moves (e.g., the client device capturing the live feed moves), the image analyzer 506 quickly updates the homography and displays the updated the perspective grid to the user.

In additional embodiments, the image analyzer 506 performs upright adjustments to an image. In particular, if an image is slightly skewed or tilted, the image analyzer 506 uses the homography to determine adjustments to correct the image to display uprightly and apply the adjustments. Further, the image analyzer 506 updates the homography to match the corrected upright image.

The display manager 508 provides a graphical user interface to the user via the client device 502. For example, as described above, the display manager 508 displays one or more scenic images to a user. Further, the display manager 508 displays a perspective grid to a user in connection with displaying an image. The display manager 508 also displays drawing strokes provided by a user, as described below.

The display manager 508 additionally displays other aspects of the drawing assistance system 502, as described herein. For example, the display manager 508 can show drawing guidelines and drawing tools to a user in connection with a drawing created by a user. As an additional example, the display manager 508 displays an asset library that allows a user to select an asset to insert into a drawing. Further, the display manager 508 provides drawing editing tools and navigational tools.

The input collector 510 receives user interaction from a user. In one or more embodiments, the input collector 510 detects, receives, and/or facilitates user input in any suitable manner. In some examples, the input collector 510 detects one or more user interactions with respect to the user interface. As referred to herein, a "user interaction" means a single interaction, or combination of interactions, received from a user by way of one or more input devices.

For example, the input collector 510 detects a user interaction from a keyboard, mouse, touch pad, touch screen, and/or any other input device. In the event the client device 500 includes a touch screen, the input collector 510 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The drawing assistance system 502 performs one or more functions in response to the input collector 510 detecting user input and/or receiving other data. Generally, a user can control, navigate within, and otherwise use the drawing assistance system 502 by providing one or more user inputs that the input collector 510 can detect. For example, in response to the input collector 510 detecting user input, one or more components of the drawing assistance system 502 allow a user to navigate through one or more user interfaces to create a drawing. Additionally, in response to the input collector 510 detecting user input, one or more components of the drawing assistance system 502 allow the user to add a stroke to a drawing.

To illustrate by way of example, in one or more embodiments, the user interacts with drawing tools to adjust the drawing guide overlaying an image. The input collector 510 detects the interaction, sends the interaction to the display manager 508, and the display manager 508 displays the appropriate drawing guide adjustments. Further, upon detecting a user adding a stroke to a drawing, the input collector 510 processes the input, sends the input to the display manager 508, and the graphical user interface displays the added stroke.

The drawing engine 512 enables a user to create accurate drawings. In particular, the drawing engine 512 provides the drawing tools and drawing guidelines, which are described above, to a user to enable the user to add strokes to a drawing. In addition, the drawing engine 512 can cause a stroke to snap to the drawing guidelines, smooth out a stroke, and/or align with a selected vanishing point, which ensures that the stroke is drawn with the correct perspective.

Further, the drawing engine 512 allows a user to manipulate (e.g., move, stretch, resize, or flip) an asset (or a group of strokes). As the user manipulates the asset, the drawing engine 512 adjusts the asset such that the asset maintains the proper perspective. For example, if the user changes the vanishing point for an asset, the drawing engine 512 adjusts the shape and skew of the asset to align with the newly selected vanishing point.

Further, if a user is drawing in a live image, the drawing engine 512 (in connection with the image analyzer 506) can track the changes in the live feed and update the perspective of the strokes in the drawing as the perspective in the live image changes. To demonstrate, the user uses the client device 500 to capture a live image of a billboard. Using the perspective grid, the user adds an asset of an advertisement poster and places the advertisement over the billboard. Then, as the user physically moves with the client device 500, the drawing engine 512 tracks the billboard and causes the advertisement to remain its position covering the billboard, in the proper perspective. In this manner, the drawing engine 512 can enable a user to preview how assets will appear from various locations, angles, and perspectives, even under a live view.

FIGS. 1-5 provide some detail regarding the assisting a user in drawing a perspective image. In particular, FIGS. 1-5 describe the process of computing a homography that assists a user in creating these perspective drawings. Additional detail will now be provided for the process of computing a homography. Further, detail is provided for image straightening correction, which in some embodiments, may also be part of the process of computing a homography for an image.

Criteria

Scenes with well-structured man-made objects often include many straight lines that are supposed to be horizontal or vertical in regards to human perception. The criteria described herein, based on observations of human perception, reflect these characteristics. One or more of these criteria may be used as constraints in the optimization framework when optimizing the homography to estimate camera parameters. Note that the criteria described in this section are described mathematically in the below section titled "Energy Terms. Of Picture Frame Alignment."

Picture Frame Alignment

When looking at a big planar facade or a close planar object such as a painting, it is usually perceived as orthogonal to the view direction, and the horizontal and vertical object lines are assumed parallel and perpendicular to the horizon, respectively. When a photo of the same scene is viewed, the artificial picture frame (i.e., borders of the image) imposes significant alignment constraints on the object lines, and the viewer may feel discomfort if the object line directions are not well aligned with the picture frame orientation. It should be noted that such an artifact becomes less noticeable as the misalignments of line directions become larger, since in that case the viewer begins to perceive three-dimensional depths from a slanted plane.

Homography Formulation

One or more embodiments may compute a homography to achieve visually plausible results, especially for man-made structures. A given image can be rectified with a homography matrix "H" using the following equation:

$$p'=Hp=K(KR)^{-1}p, \quad (1)$$

where "p" and "p'" represent a position and its re-projection in the image, respectively "K" and "R" are intrinsic parameters, and orientation matrices of the camera, respectively:

$$K = \begin{pmatrix} f & 0 & u_0 \\ 0 & f & v_0 \\ 0 & 0 & 1 \end{pmatrix} \text{ and } R = R_\psi R_\theta R_\phi, \quad (2)$$

where "$R_\Psi$," "$R_\theta$," and "$R_\phi$" are rotation matrices with angles "$\Psi$," "$\theta$," and "$\phi$" along the "x," "y," and "z" axes, respectively. Note that "R" may be referred to herein as an orientation matrix "R."

In some instances, when an image is corrected to display uprightly, image rectification may generate a visually unpleasing result. Further, when an image is uprightly corrected, the homography of the image should be adjusted to match the corrected image. In at least some implementations of the automatic upright adjustment technique, for upright adjustment, Equation 1 may be modified to support flexible control for enhancing the perceptual quality of the results over that of a simple rectification. In at least some implementations, the homography may be defined by the following re-projection model:

$$p'=Hp=K_1\{R_1(KR)^{-1}p+t_1\} \quad (3)$$

where:

$$K_1 = \begin{pmatrix} f_{1x} & 0 & u_1 \\ 0 & f_{1y} & v_1 \\ 0 & 0 & 1 \end{pmatrix}, \text{ and } R_1 = R_{\psi 1}R_{\theta 1}R_{\phi 1} \text{ and } t_1 = [t_{1x}t_{1y}0]^T. \quad (4)$$

Compared to Equation 1, Equation 3 contains an intrinsic parameter matrix "$K_1$" with additional three-dimensional rotation "$R_1$" and translation "$t_1$." This re-projection model implies re-shooting of the rectified scene using another camera placed at a possibly different position with novel orientation. In at least some implementations, this new camera may also be allowed to have different focal lengths in horizontal and vertical directions.

Adjustment Optimization Framework

In one or more embodiments, an energy function for the image transformation (e.g., Equations 1 and/or 3) according to the criteria based on human perception described above. In at least some implementations, it can be assumed that camera parameters "K" and "R" have been estimated by a camera calibration technique. Thus, there are at most nine unknowns "$f_{1x}$," "$f_{1y}$," "$u_1$," "$v_1$," "$\Psi_1$," "$\theta_1$," "$\phi_1$," "$t_x$," and "$t_y$" in Equations 1 and/or 3. "$u_1$" and "$v_1$" simply shift the result image after the transformation, and thus may be set as "$u_1=u_0$" and "$v_1=v_0$". As such, various embodiments seek to optimize Equations 1 and/or 3 with respect to the parameters of homography matrix "H."

Although other techniques can also be used for camera calibration, a technique for robust camera calibration that may be used in at least some implementations is presented in the section titled Camera Calibration Technique. Using camera calibration technique, at least one or more embodiments may take the Manhattan world assumption, which is that the major line structures of the scene are aligned to the "x," "y," and "z" directions in three dimensions. For example, a rectangular building may be assumed to follow the principal directions of the world.

In multiple embodiments, Manhattan directions "$M=[v_x \ v_y \ v_z]$" may be obtained in addition to "K" and "R," where "$v_x$," "$v_y$," and "$v_z$" represent the three vanishing points corresponding to the "x," "y," and "z" directions, respectively. These embodiments may also obtain three pencils of vanishing lines, "$L_x$," "$L_y$," and "$L_z$," which contain two dimensional lines intersecting at vanishing points "$v_x$," "$v_y$," and "$v_z$," respectively. The vanishing lines in "$L_x$," "$L_y$," and "$L_z$," are projections of three-dimensional lines that are parallel to the "x," "y," and "z" axes, respectively.

Energy Terms of Picture Frame Alignment

For major line structures of the scene to be aligned with the picture frame, vanishing lines corresponding to "x" and "y" directions for purposes of human perception should be horizontal and vertical in a photo, respectively. That is, vanishing lines in "$L_x$" and "$L_y$" are to be transformed to horizontal and vertical lines by a homography "H," making vanishing points "$v_x$" and "$v_y$" placed at infinity in the "x" and "y" directions, respectively.

Let "l" be a vanishing line, and "p" and "q" two end points of "l." The direction of the transformed line "l" may be expressed as follows:

$$d = \frac{q'-p'}{\|q'-p'\|}, \quad (5)$$

where $$p' = \frac{Hp}{e_z^T Hp} \text{ and } q' = \frac{Hq}{e_z^T Hq}. \quad (6)$$

In addition, the expression "$e_z=[0 \ 0 \ 1]^T$" may be used to normalize homogeneous coordinates. In at least some implementations, the energy term may be defined as:

$$E_{pic}=\lambda_v \Sigma_i w_i (e_x^T d_{yi})^2 + \lambda_h \Sigma_j w_j (e_y^T d_{xj})^2, \quad (7)$$

where "$d_{yi}$" is the direction of the transformed line "$l'_{yi}$" of a vanishing line "$l_{yi}$" in "$L_y$." Further, the terms $e_x=[1 \ 0 \ 0]^T$" and "$e_x^T d_{yj}$" are the deviation of "$l'_{yi}$" from the vertical direction. The term "$d_{xj}$" is defined similarly for a vanishing line "$l_{xj}$" in "$L_x$," and "$e_y=[0\ 1\ 0]^T$" is used to measure the horizontal deviation.

In Equation 7, the weight "w" for a line "l" is the original line length before transformation, normalized by the calibrated focal length "f," (i.e., w=‖q−p‖/f). Additionally, the weights "$\lambda_v$" and "$\lambda_h$" may be adaptively determined using initial rotation angles, as the constraint of picture frame alignment becomes weaker as rotation angles get bigger. At least some implementations may use:

$$\lambda_u = \exp\left(-\frac{\psi^2}{2\sigma_v^2}\right) \text{ and } \lambda_h = \exp\left(-\frac{\theta^2}{2\sigma_h^2}\right) \tag{8}$$

where "Ψ" and "θ" are calibrated rotation angles along the "x" and "y" axes respectively. "$\sigma_v$" and "$\sigma_h$" are parameters usable to control the tolerances to the rotation angles. In one or more embodiments, these control parameters may be fixed as "$\sigma_v=\pi/12$" and "$\sigma_h=\pi/15$." Other values may be used for the control parameters, and in some embodiments, the control parameters may be adjustable, for example via user input.

Homography Optimization Parameters

In at least some implementations, the parameters for homography optimization described above may be adjusted to fulfill the user's intention. For example, relaxing the eye-level constraint may not be recommended, because this criterion is enforced to obtain a perceptually better result. However, a user may wish to control the effect of picture frame alignment by manipulating "$\sigma_v$" and "$\sigma_{h3}$," to avoid too aggressive adjustments. Thus, at least some implementations may provide a technique, for example via a user interface via which the user may adjust one or more homography optimization parameters.

Camera Calibration Techniques

As described below, a variety of different optimization-based technique for camera calibration are described that may, for example, be used to estimate the matrices "K" and "R" in Equations 1 and/or 3, in at least some implementations. As a note, Manhattan directions "M" are first determined using vanishing lines and vanishing points detected from the input photo, and then "K" and "R" are directly obtained from "M." However, in determining "M," corresponding vanishing points for the "x," "y," and "z" axes may not be obvious because there could be many vanishing points, possibly with position errors. This can cause the inaccuracy of "M" to immediately propagated to "K" and "R" in such instances.

In contrast, embodiments described herein may estimate "K," "R," and "M" in conjunction with each other (i.e., "simultaneously"), for example using a maximum a posteriori (MAP) approach, which may produce results with increased reliability in comparison with these conventional techniques.

While the camera calibration technique is described as being used in at least some implementations to estimate camera parameters and vanishing points and lines for an input image, note that the technique may be applied in other digital image processing techniques and techniques than those described herein to estimate camera parameters and/or vanishing points and lines for an input image.

Line Segment Detection

Line segments are basic primitives in implementations of the calibration technique. From the input image, a set of line segments "L" may be extracted, for example using a technique in a multi-scale fashion. For each line segment "$l_i$," its two end points "$p_i$" and "$q_i$" may be stored.

Calibration Formulation

In at least some implementations, the joint probability of Manhattan directions "M," intrinsic matrix "K," and orientation matrix "R" with respect to line segments "L" can be expressed as follows:

$$p(K,R,M|L) \propto p(L|K,R,M)p(K,R,M) = p(L|M)p(M|K,R)p(K)p(R) \tag{9}$$

with assumptions that "K" and "R" are independent of each other and also independent of "L." By taking log probability, Equation (A9) may be rephrased into an energy function as:

$$E_{K,R,M|L} = E_K + E_R + E_{M|K,R} + E_{L|M}. \tag{10}$$

Prior $E_K$

To define the prior for "K," at least some implementations may assume that the center of projection "$c_p=(u_0, v_0)$" is the image center "$c_I=(c_x, c_y)$," and that the focal length "f" is the image width "W" "$E_K$" may then be defined as:

$$E_K = \lambda_f\left(\frac{\max(W,f)}{\min(W,f)} - 1\right)^2 + \lambda_c\|c_p - c_I\|^2 \tag{11}$$

Some embodiments set "$\lambda_f$ as 0.04" and "$\lambda_c$ as $(10/W)^2$." Other embodiments, however, may user other values as further described below.

Prior $E_r$

For the prior of "R," at least some embodiments may assume that the orientation of the camera is aligned with the principal axes of the world, which is a reasonable assumption in most cases. Thus, in at least some implementations:

$$E_R = \lambda_\psi \psi^2 + \lambda_\theta \theta^2 + \lambda_\phi \phi^2 \tag{12}$$

In at least some implementations, the three rotation angles are not weighted equally. Particularly, it can be found that the prior for φ (z-axis rotation) should be stronger to enforce eye-level alignment. Thus, at least some implementations may use "$[\lambda_\psi, \lambda_\theta, \lambda_\phi]=[4/\pi\ 3/\pi\ 6/\pi]^2$."

Posterior $E_{M|K,R}$

In at least some implementations, if "K" and "R" are known, "M" can be estimated as:

$$M = [v_x v_y v_z] = (KR)I_3, \tag{13}$$

where "$I_3=[e_x\ e_y\ e_z]$" is the identify matrix. In at least some implementations, using this property, an energy function may be formulated as follows:

$$E_{M|K,R} = \lambda_M \sum_{i \in \{x,y,z\}} \left[\cos^{-1}\left\{e_i^T \frac{(KR)^{-1}v_i}{\|(KR)^{-1}v_i\|}\right\}\right]^2. \tag{14}$$

This energy function covers the orthogonality of Manhattan directions and the prior for zenith. In various embodiments, "$\lambda_M$" may be set as "$(24/\pi)^2$." However, other values for "$\lambda_M$" may be used in some embodiments.

Posterior $E_{L|M}$

The term "$E_{L|M}$" measures the conformity of detected line segments to the estimated vanishing points. In at least some embodiments, vanishing points for which more line segments could be parts of vanishing lines may be desirable. In at least some implementations, the energy function is:

$$E_{L|M} = \lambda_L \sum_i \min\{d(v_x, l_i), d(v_y, l_i), d(v_y, l_i)\}, \quad (15)$$

where "d(•)" is the distance between a vanishing point and a line. Further, some implementations may use the following distance definition:

$$d(v, 1) = \min\left(\frac{|r^T p|}{\sqrt{r_1^2 + r_2^2}}, \delta\right) \quad (16)$$

where "p" and "q" are two end points of "l" and:

$$r = \left(\frac{p+q}{2}\right) \times v = [r_1 r_2 r_3]^T. \quad (17)$$

The term "δ," in various embodiments, is the given maximum error value. In some embodiments, "δ" may be 1.75 and/or "$\lambda_L$" may be set to 0.02. However, note that other values may be used for "δ" and/or "$\lambda_L$" in other embodiments.

Dealing with Missing Vanishing Points

When "M" is estimated, all three vanishing points may not be found in some cases. In at least some implementations, for robustness, the energy terms "$E_{M|K,R}$" and "$E_{L|M}$" may be able to handle this case. In at least some implementations, for "$E_{M|K,R}$" the energy may be set to zero for a missing vanishing point, assuming that the point is located at the position estimated using "K" and "R." In at least some implementations, for "$E_{L|M}$, $d(v_{miss}, l_i)$ is δ for $l_i$."

Grouping Vanishing Lines

After the calibration process, at least some implementations may determine the vanishing lines for each vanishing point in "M." Three sets of vanishing lines, "$L_x$," "$L_y$," and "$L_z$," may be obtained from "L" by:

$$L_i = \{l \in L | d(v_i, l) < \delta\}, i \in \{x, y, z\}, \quad (18)$$

where "d(•)" is the distance function defined in Equation 16.

FIGS. 1-5, the corresponding text, and the examples, provide a number of different systems and devices for providing drawing assistance in creating a perspective drawing. In addition to the foregoing, embodiments also can be described in terms of flowcharts comprising acts and steps in a method for accomplishing a particular result. For example, FIGS. 6 and 7 illustrate flowcharts of exemplary methods in accordance with one or more embodiments.

Figure 6:
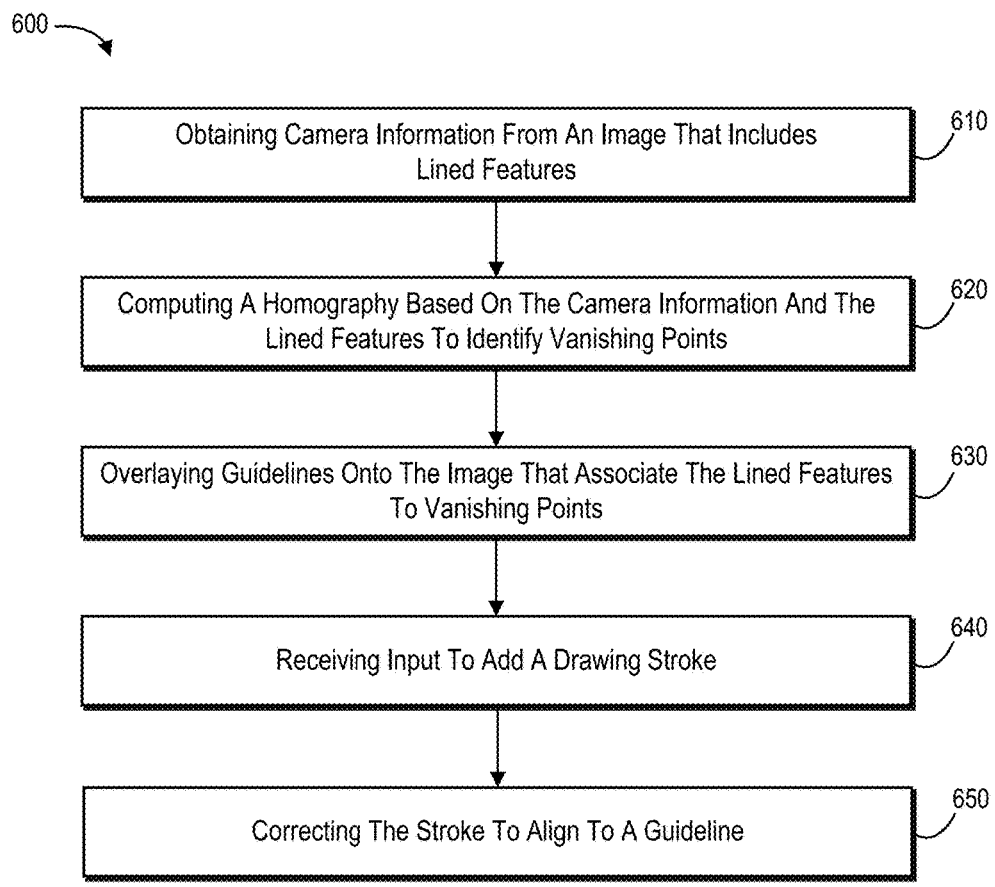
FIG. 6 illustrates a flowchart of an exemplary method for providing assisted perspective drawings in accordance with one or more implementations.
Figure 7:
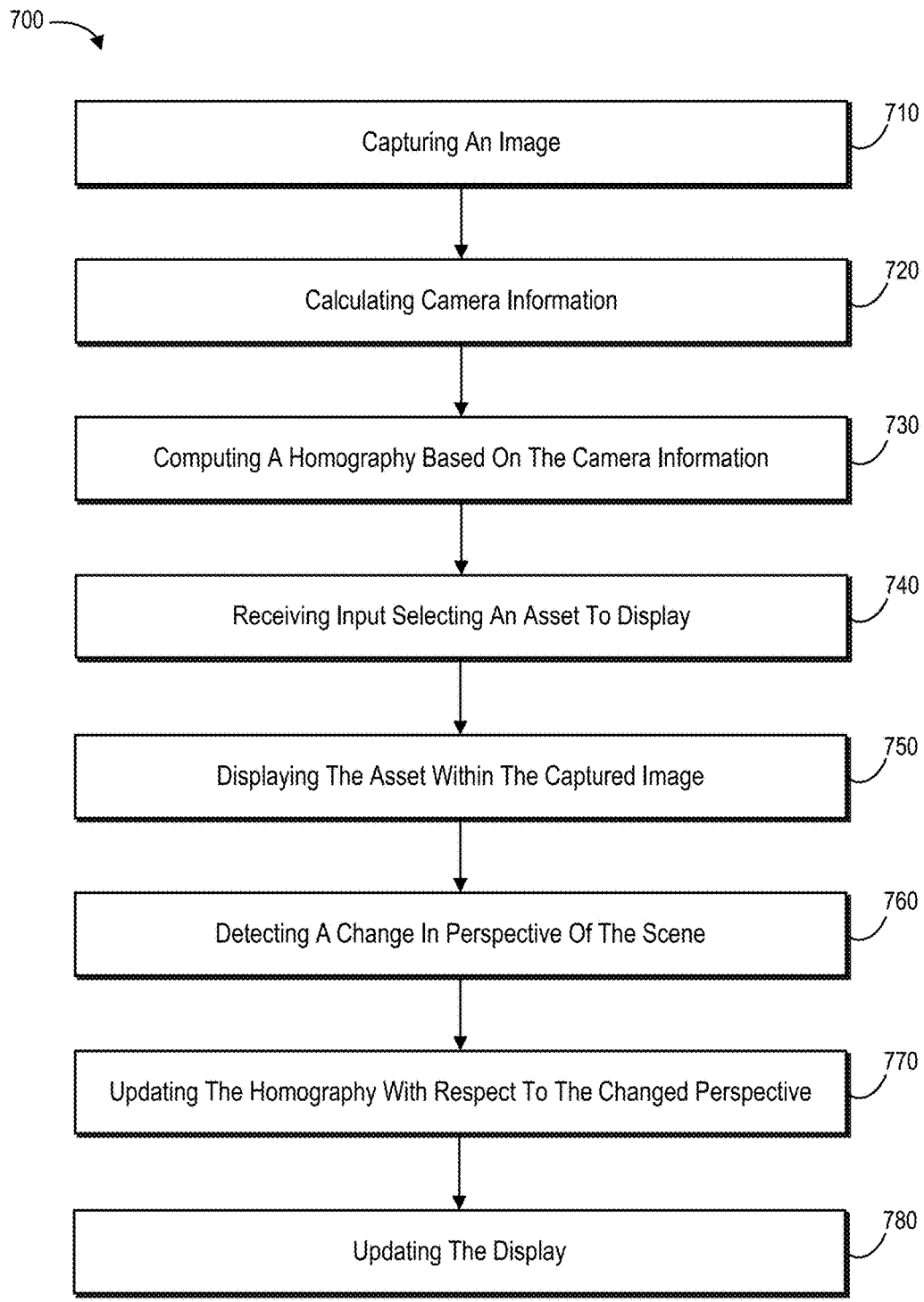
FIG. 7 illustrates flowchart of another exemplary method for providing assisted perspective drawings in accordance with one or more implementations.

FIG. 6 illustrates a flowchart of an exemplary method 600 for providing assisted perspective drawings. In one or more embodiments, the method 600 may be performed in a digital environment for creating illustrations from captured photographs. Further, in some embodiments, a computing device, such as client device 500, may perform the method 600.

The method 600 includes an act 610 of obtaining perspective information from an image that includes lined features. In particular, the method may involve obtaining perspective information for an image of a scene that includes a plurality of lined features. In one or more embodiments, obtaining perspective information may involve performing camera calibration to estimate camera parameters. In various embodiments, the scene includes at least one man-made structure.

The method 600 also includes an act 620 of computing a homography based on the perspective information and the lined features to identify vanishing points. In particular, the act 620 may involve computing a homography based on the perspective information and the plurality of lined features to identify a plurality of vanishing points associated with the image. The act 620, in some embodiments, may involve estimating matrices, including camera parameter matrices and/or a homography matrix.

The method 600 also includes an act 630 of overlaying guidelines onto the image that associate the lined features to vanishing points. In particular, the act 630 may involve overlaying guidelines from the homography onto the image that associate the plurality of lined features to a vanishing point of the plurality of vanishing points. The act 630 may also involve annotating the guidelines on the image. In various embodiments, the guidelines from the homography form a perspective grid of guidelines that associate the plurality of lined features to the plurality of vanishing points. Further, in some embodiments, the act 630 may involve providing a drawing guideline on which a drawing stroke can be added, where the drawing guideline aligns to the vanishing point of the plurality of vanishing points.

The method 600 also includes an act 640 of receiving input to add a drawing stroke. In particular, the act 640 may involve receiving input to add a drawing stroke in relation to a lined feature of the image. The act 640 may also involve adding, in response to receiving the input, a drawing stroke to the lined feature, the stroke conforming to the homography and a vanishing point of the plurality of vanishing points. In multiple embodiments, the drawing stroke is added to a line drawing.

The method 600 also includes an act 650 of correcting the stroke to align to a guideline. In particular, the act 650 may involve correcting the stroke to at least partially align the stroke to a guideline of the guidelines that overlays the lined feature. For example, the act 650, in some embodiments, involves snapping the drawing stroke to the guideline such that the drawing stroke aligns with a particular vanishing point.

The method 600 may also include various additional acts. For example, the method 600 may involve the acts of receiving a selection to change focus from the vanishing point to an additional vanishing point of the plurality of vanishing points, and in response to the selection to change focus to the additional vanishing point, changing the drawing guideline to align to the additional vanishing point. Additionally, in one or more embodiments, each guideline includes an attribute that is dependent upon a correlation to a lined feature of the plurality of lined features. Further, the attribute can be thickness, hue, or opacity of the guideline.

The method 600 may also include the acts of receiving a selection of an asset, and inputting the asset into a line drawing, where the asset conforms to the homography and a vanishing point of the plurality of vanishing points. Further acts of method 600 can include receiving input moving the asset to a new location within the line drawing, and adjusting the shape of the asset to conform to the homography and a vanishing point of the plurality of vanishing points based on the new location.

Referring now to FIG. 7, a flowchart of another exemplary method 700 of providing assisted perspective drawings is illustrated. In one or more embodiments, the method 700 may be performed in a digital environment for creating illustrations from captured photographs. Further, in some embodiments, a computing device, such as client device 500, may perform the method 700.

The method 700 also includes an act 710 of capturing an image. In particular, the act 710 may involve capturing, by a client device, an image of a scene that includes a plurality of lined features. In some embodiments, the image of the scene is captured in real-time. Further, in various embodiments, the scene includes at least one man-made structure.

The method 700 also includes an act 720 of calculating perspective information. In particular, the act 720 may involve calculating perspective information for the captured image based on the plurality of lined features. In one or more embodiments, obtaining perspective information may involve performing camera calibration to estimate camera parameters.

The method 700 also includes an act 730 of computing a homography based on the perspective information. In particular, the act 730 may involve computing a homography based on the perspective information, the homography aligning each of the plurality of lined features to a corresponding vanishing point of a plurality of vanishing points. The act 730, in some embodiments, may involve estimating matrices, including camera parameter matrices and/or a homography matrix.

The method 700 also includes an act 740 of receiving input selecting an asset to display. In particular, the act 740 may involve receiving input selecting an asset to display in connection with the homography. In one or more embodiments, the act 740 includes providing an asset library that includes a number of assets that a use can select to display within a line drawing.

The method 700 also includes an act 750 of displaying the asset within the captured image. In particular, the act 750 may involve displaying the asset within the captured image such that the asset conforms to the homography and a vanishing point of the plurality of vanishing points. The method 700 also includes an act 760 of detecting a changed in perspective of the scene. In particular, the act 760 may involve detecting movement of the client device changing the perspective of the scene.

The method 700 also includes an act 770 of updating the homography with respect to the changed perspective. In particular, the act 770 may involve updating the homography with respect to the changed perspective of the scene. In some embodiments, the process of updating the homography requires less computation and occurs more quickly than computing the initial homography. As such, in some embodiments, the homography is updated with respect to the changed perspective of the scene in real-time or near-real-time.

The method 700 also includes an act 780 of updating the display. In particular, the act 780 may involve updating the display of the asset within the captured image to conform to the updated homography. The act 780 may also involve hiding the image to display only the asset and drawing strokes in a drawing.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The term "digital environment," as used herein, generally refers to an environment that is implemented, for example, as a stand-alone application (e.g., a personal computer or mobile application running on a computing device), as a module of an application, as a plug-in for an application, as a library function or functions that may be called by a network application creation system, and/or as a cloud-computing system. A digital medium environment allows users to create, view, and/or edit drawings and sketches.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
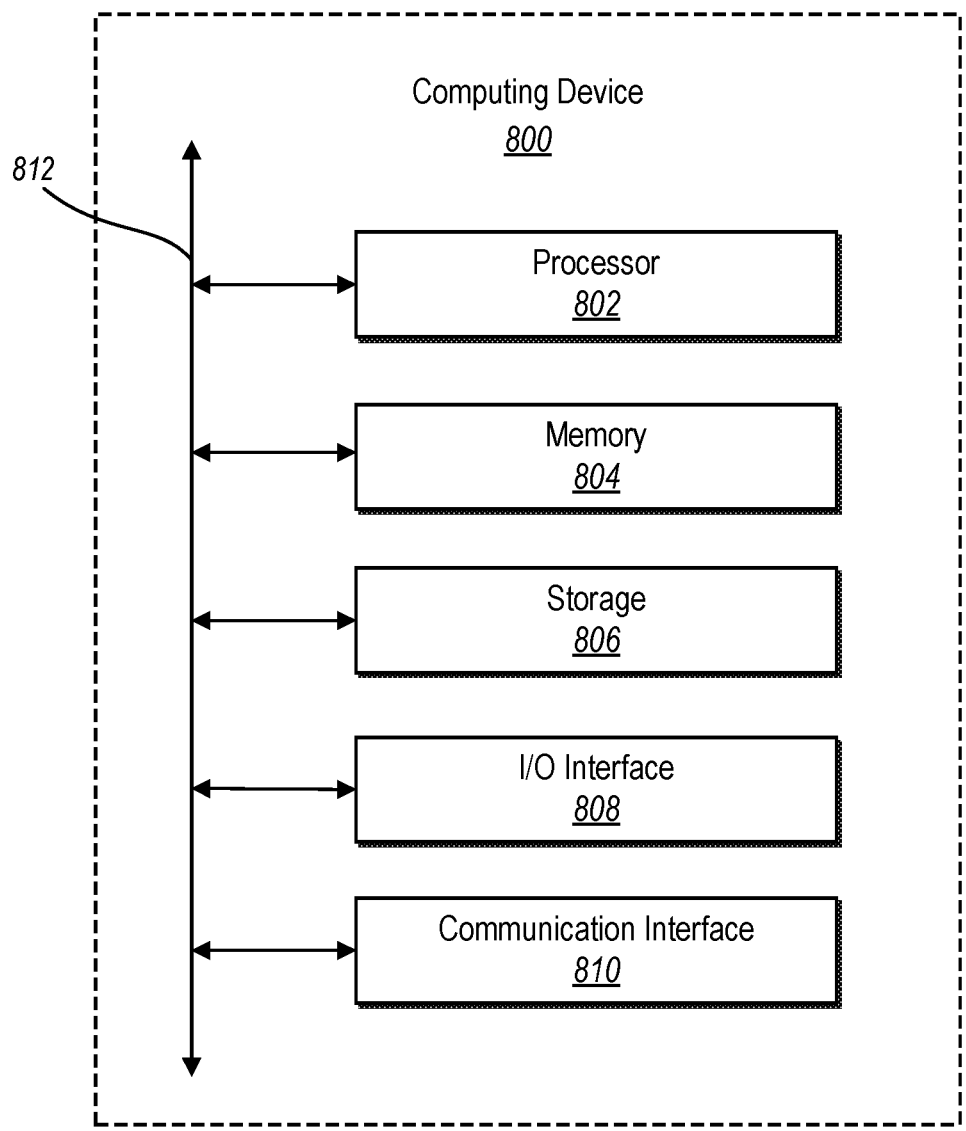
FIG. 8 illustrates a block diagram of an exemplary computing device in accordance with one or more implementations.

FIG. 8 illustrates a block diagram of an exemplary computing device 800 that may be configured to perform one or more of the processes described above. One will appreciate that one or more computing devices, such as the computing device 800, may host the drawing assistance system 502, and may be an example embodiment of the computing device 500 described above. As shown by FIG. 8, the computing device 800 can comprise a processor 802, memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In particular embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In particular embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, the storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In particular embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital environment for creating illustrations from captured photographs, a method for providing assisted perspective drawings, the method comprising:
   displaying a line drawing over an image of a scene, the image including a plurality of lined features;
   obtaining perspective information for the image;
   generating, by at least one processor, a homography for the image based on the perspective information and the plurality of lined features to identify a plurality of vanishing points associated with the image;
   overlaying guidelines from the homography onto the line drawing that associate the plurality of lined features of the image to the plurality of vanishing points associated with the image;
   receiving, from an input device associated with a user, input to add a drawing stroke to the line drawing in relation to a first lined feature of the plurality of lined features of the image, wherein the input comprises a starting point at which the user engages the input device, an ending point at which the user disengages the input device, and a path between the starting point and the ending point;
   correcting the drawing stroke within the line drawing to at least partially align the path between the starting point and the ending point for the drawing stroke to a first guideline of the guidelines that overlays the first lined feature and projects to a first vanishing point of the plurality of vanishing points;
   and
   removing the image and the overlaid guidelines to display the corrected stroke in the line drawing.

2. The method of claim 1, further comprising:
   receiving input moving the corrected stroke to a new location within the line drawing;
   detecting, based on the new location, a second guideline of the guidelines that overlays a second line feature of the plurality of lined features and projects to a second vanishing point of the plurality of vanishing points; and
   adjusting the corrected stroke to conform to the second guideline.

3. The method of claim 1, further comprising:
   receiving a selection to change focus from the first vanishing point to a second vanishing point of the plurality of vanishing points;
   receiving, from the input device associated with the user, a second input to add a second drawing stroke to the line drawing in relation to a second lined feature of the plurality of lined features of the image;
   correcting the second drawing stroke within the line drawing to at least partially align to a second guideline of the guidelines that overlays the second lined feature and projects to a second vanishing point of the plurality of vanishing points; and displaying the corrected stroke and the second corrected stroke in the line drawing.

4. The method of claim 1, wherein generating the homography for the image comprises estimating a camera parameter matrix.

5. The method of claim 1, further comprising receiving a selection to toggle visibility of the image and the overlaid guidelines with respect to the line drawing.

6. The method of claim 5, further comprising limiting display of guidelines overlaid on the line drawing to a subset of guidelines that correspond to a selected vanishing point.

7. The method of claim 1, wherein the input device is a client device associated with the user.

8. The method of claim 1, wherein each of the guidelines comprise a guideline attribute based on a correlated lined feature of the plurality of lined features.

9. The method of claim 8, wherein the guideline attribute is one of thickness or opacity.

10. The method of claim 1, further comprising:
receiving a selection of an asset; and
inputting the asset into the line drawing by conforming the asset to the first guideline and the first vanishing point.

11. The method of claim 10, further comprising:
receiving input moving the asset to a new location within the line drawing;
detecting based on the new location, a second guideline of the guidelines that overlays a second line feature of the plurality of lined features and projects to a second vanishing point of the plurality of vanishing points; and
adjusting a shape of the asset to conform to the second guideline and the second vanishing point.

12. A non-transitory computer-readable medium storing instructions thereon that, when executed by at least one processor, cause a client device to:
capture an image of a scene that includes a plurality of lined features;
generate perspective information for the captured image based on the plurality of lined features;
generate an initial homography based on the perspective information, the initial homography aligning each of the plurality of lined features to a plurality of vanishing points;
receive input selecting an asset to display in connection with the initial homography at a first position;
display the asset at the first position within the captured image such that the asset conforms to the initial homography and a vanishing point of the plurality of vanishing points;
detect movement of the client device changing the perspective of the scene;
automatically track the first position of the asset within the scene upon detection of the movement of the client device,
update the initial homography with respect to the changed perspective of the scene, wherein updating the initial homography requires less computations that generating the initial homography; and
update the display of the asset within the captured image to conform to the updated homography and the tracked first position of the asset within the scene.

13. The non-transitory computer-readable medium of claim 12, wherein the image of the scene is captured by the client device associated with a user in real-time, and wherein the initial homography is updated with respect to the changed perspective of the scene in near-real-time.

14. The non-transitory computer-readable medium of claim 12, wherein guidelines from the initial homography form a perspective grid of guidelines that associate the plurality of lined features to the plurality of vanishing points.

15. The non-transitory computer-readable medium of claim 14, wherein each of the guidelines comprises an attribute that correlates to a lined feature attribute of a corresponding lined feature.

16. The non-transitory computer-readable medium of claim 15, wherein a thickness or an opacity of a first guideline is based on a length of a first lined feature to which the first guideline corresponds.

17. In a digital environment for creating illustrations from captured photographs, a system for providing assisted perspective drawings, the system comprising:
at least one processor; and
at least one non-transitory computer readable storage medium storing instructions that, when executed by the at least one processor, cause the system to:
display a line drawing over an image of a scene, the image including a plurality of lined features;
obtain perspective information for the image;
generate a homography for the image based on the perspective information and the plurality of lined features to identify a plurality of vanishing points associated with the image;
overlay guidelines from the homography onto the line drawing that associate the plurality of lined features of the image to the plurality of vanishing points associated with the image; and
receive, from an input device associated with a user, input to add a drawing stroke to the line drawing in relation to a first lined feature of the plurality of lined features of the image, wherein the input comprises a starting point at which the user engages the input device, an ending point at which the user disengages the input device, and a path between the starting point and the ending point;
correct the drawing stroke within the lined drawing to at least partially align the path between the starting point and the ending point for the drawing stroke to a first guideline of the guidelines that overlays the first lined feature and projects to a first vanishing point of the plurality of vanishing points; and
remove the image and the overlaid guidelines to display the corrected stroke in the line drawing.

18. The system of claim 17, further comprising instructions that, when executed by the at least one processor, cause the system to provide a first subset of guidelines on which the drawing stroke can be added, wherein the first subset of guidelines align to the first vanishing point of the plurality of vanishing points.

19. The system of claim 18, further comprising instructions that, when executed by the at least one processor, cause the system to receive a selection to change focus from the first vanishing point to a second vanishing point of the plurality of vanishing points.

20. The system of claim 19, further comprising instructions that, when executed by the at least one processor, cause the system to change, in response to the selection to change focus to the second vanishing point, the homography to hide the first subset of guidelines that align to the first vanishing point and display a second subset of guidelines that align to the second vanishing point.

\* \* \* \* \*